(12) United States Patent
Yin et al.

(10) Patent No.: US 7,624,116 B2
(45) Date of Patent: Nov. 24, 2009

(54) SYSTEM AND METHOD FOR MANAGING OBJECTS ACCORDING TO THE COMMON INFORMATION MODEL

(75) Inventors: Jianwen Yin, Round Rock, TX (US); Javier L. Jimenez, Austin, TX (US); Khachatur Papanyan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 315 days.

(21) Appl. No.: 11/388,115

(22) Filed: Mar. 23, 2006

(65) Prior Publication Data

US 2007/0226232 A1 Sep. 27, 2007

(51) Int. Cl.
*G06F 17/30* (2006.01)
(52) U.S. Cl. .................... 707/101; 707/1; 707/100; 707/102; 707/104.1
(58) Field of Classification Search .......... 707/1, 707/100–102, 104.1; 719/316
See application file for complete search history.

(56) References Cited

U.S. PATENT DOCUMENTS

| | | | | |
|---|---|---|---|---|
| 6,317,748 | B1 | 11/2001 | Menzies et al. | 707/103 X |
| 6,854,122 | B1 | 2/2005 | Sheriff et al. | 719/316 |
| 6,862,736 | B2 | 3/2005 | Hudis et al. | 719/316 |
| 6,971,090 | B1* | 11/2005 | Gruttadauria et al. | 717/136 |
| 7,143,156 | B2 | 11/2006 | Menzies et al. | 709/223 |
| 7,159,125 | B2* | 1/2007 | Beadles et al. | 713/193 |
| 7,287,037 | B2* | 10/2007 | An et al. | 707/102 |
| 2002/0107872 | A1 | 8/2002 | Hudis et al. | 707/104.1 |
| 2003/0135657 | A1 | 7/2003 | Barker et al. | 709/310 |
| 2003/0217195 | A1* | 11/2003 | Mandal et al. | 709/330 |
| 2004/0015889 | A1* | 1/2004 | Todd et al. | 717/137 |
| 2004/0025142 | A1 | 2/2004 | Mandal et al. | 707/104 |
| 2005/0050056 | A1 | 3/2005 | Idicula et al. | 707/100 |
| 2005/0071363 | A1 | 3/2005 | Chen et al. | 707/102 |
| 2005/0108725 | A1* | 5/2005 | Hudis et al. | 719/316 |
| 2005/0193109 | A1 | 9/2005 | Hudis et al. | 709/223 |
| 2006/0026195 | A1* | 2/2006 | Gu et al. | 707/102 |

(Continued)

FOREIGN PATENT DOCUMENTS

EP 1061446 A2 12/2000

OTHER PUBLICATIONS www.dmtf.org/standards/cim, Common Information Model Standards, 2007.

(Continued)

*Primary Examiner*—Cam-Linh Nguyen
(74) *Attorney, Agent, or Firm*—Baker Botts L.L.P.

(57) ABSTRACT

A system and method is disclosed for managing objects in accordance with the Common Information Model. The system and method disclosed herein includes an abstract layer that receives requests from the CIM clients through the CIM Object Manager. After the receipt of a request, the abstract layer retrieves the associated XML registration file for the generation of a command to the managed object that is the target of the request. After the command is executed with respect to the managed object, the requested data is returned to the abstract layer. The data returned to the abstract layer is in the form of untransformed XML content. The abstract layer retrieves an XSL transformation file and transforms the XML content into an instance of CIM data and transfers this data to the CIM Object Manager.

21 Claims, 3 Drawing Sheets

U.S. PATENT DOCUMENTS

2007/0226232 A1 9/2007 Yin et al. .................... 707/100

OTHER PUBLICATIONS

Patents Act 1977 Examination Report 18(3), Application No. GB 0705416.6, 1 page, May 30, 2008.

Office Action for Chinese Patent Application No. 200710089459.3, 10 pages, Jun. 20, 2008.

Office Communication for Singapore Application No. 0702066-2, 6 pages, Jul. 21, 2008.

Office Action for GB 0705416.6, dated Feb. 19, 2009.

Chinese Office Action for Application No. 200710089459.3, dated Mar. 20, 2009.

Office Action for DE 10 2007013 530.2-53, dated Mar. 30, 2009.

* cited by examiner

SYSTEM AND METHOD FOR MANAGING OBJECTS ACCORDING TO THE COMMON INFORMATION MODEL

TECHNICAL FIELD

The present disclosure relates generally to computer systems and information handling systems, and, more particularly, to a system and method for managing objects according to the Common Information Model.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

The Distributed Management Task Force, Inc. (DMTF) is an organization involved in the development of management standards computing systems. One DMTF standard is the Common Information Model (CIM). The Common Information Model provides a common definition of management information for systems, networks, applications, and services, while allowing for vendor extensions of the same. CIM's common definitions enable vendors to exchange management information between systems throughout the network. The CIM standard is composed of both a CIM specification and a CIM schema. The CIM schema provides the data model for each managed object of the system. Objects identify and describe the resources of the system. Standard CIM schema covers many of the standard elements of a computer system.

A system that supports the CIM will include a CIM Object Manager (CIMOM), which provides an interface between CIM providers and management applications. A CIM provider retrieves data and event notifications from the managed objects of the system. Because the standard CIM schema definitions evolve rapidly, a modification to a standard schema for a managed object may necessitate the modification of the code of the provider associated with the managed object and a recompilation of the provider. In addition, additional testing may be required to validate the modifications to the schema and the provider.

SUMMARY

In accordance with the present disclosure, a system and method is disclosed for managing objects in accordance with the Common Information Model. The system and method disclosed herein includes an abstract layer that receives requests from the CIM clients through the CIM Object Manager. After the receipt of a request, the abstract layer retrieves the associated XML registration file for the generation of a command to the managed object that is the target of the request. After the command is executed with respect to the managed object, the requested data is returned to the abstract layer. The data returned to the abstract layer is in the form of untransformed XML content. The abstract layer retrieves an XSL transformation file and transforms the XML content into an instance of CIM data and transfers this data to the CIM Object Manager.

The system and method disclosed herein is technically advantageous because it provides a flexible and adaptable method for managing objects in a CIM environment. The system and method disclosed herein provides an abstract layer that is able to generate commands and translate received data in response to requests from a CIM client. Because of the existence of the abstract layer, a modification to the CIM schema can be easily accommodate by the system by the modification of the XML registration files, XSL transformation files, and, if necessary, the Managed Object Format (MOF) files of the CIM Object Manager. Because of the structure of the system and method disclosed herein, the abstract layer does not need to be modified to accommodate changes to the CIM schema, and significant code changes are avoided. Thus, the system and method is forward-compatible without the necessity of rewriting lower level software code following each change to the CIM schema. In addition, another technical advantage of the system and method disclosed herein also promotes the reuse of software code modules in the XML registration files and the XSL transformation files. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

The system and method disclosed herein involves the use of a CIM provider abstract layer, which interfaces with the CIMOM, executes actions requested by the CIMOM, and, following the completion of the requested actions, returns requested information to the CIMOM. To collect data from object modules on the basis of requests from the CIMOM, the CIM provider abstract layer interfaces with data access modules through loading libraries, command line interfaces, and, in the case of static information, data files. The system and method disclosed herein also involves the use of extensible markup language (XML) registration files. For each CIM operation that can be requested by the CIMOM, an XML registration file includes information necessary for the execution of the command. In the case of data retrieved from a library, an XML registration file will include identity of the library to be read, the command to be executed, and the parameters of the command. In the case of data retrieved from a command line interface, the XML registration file will include the command line interface command and the parameters of the command, and in the case of data to be retrieved from a data file, the XML registration file identifies the data file.

Figure 1:
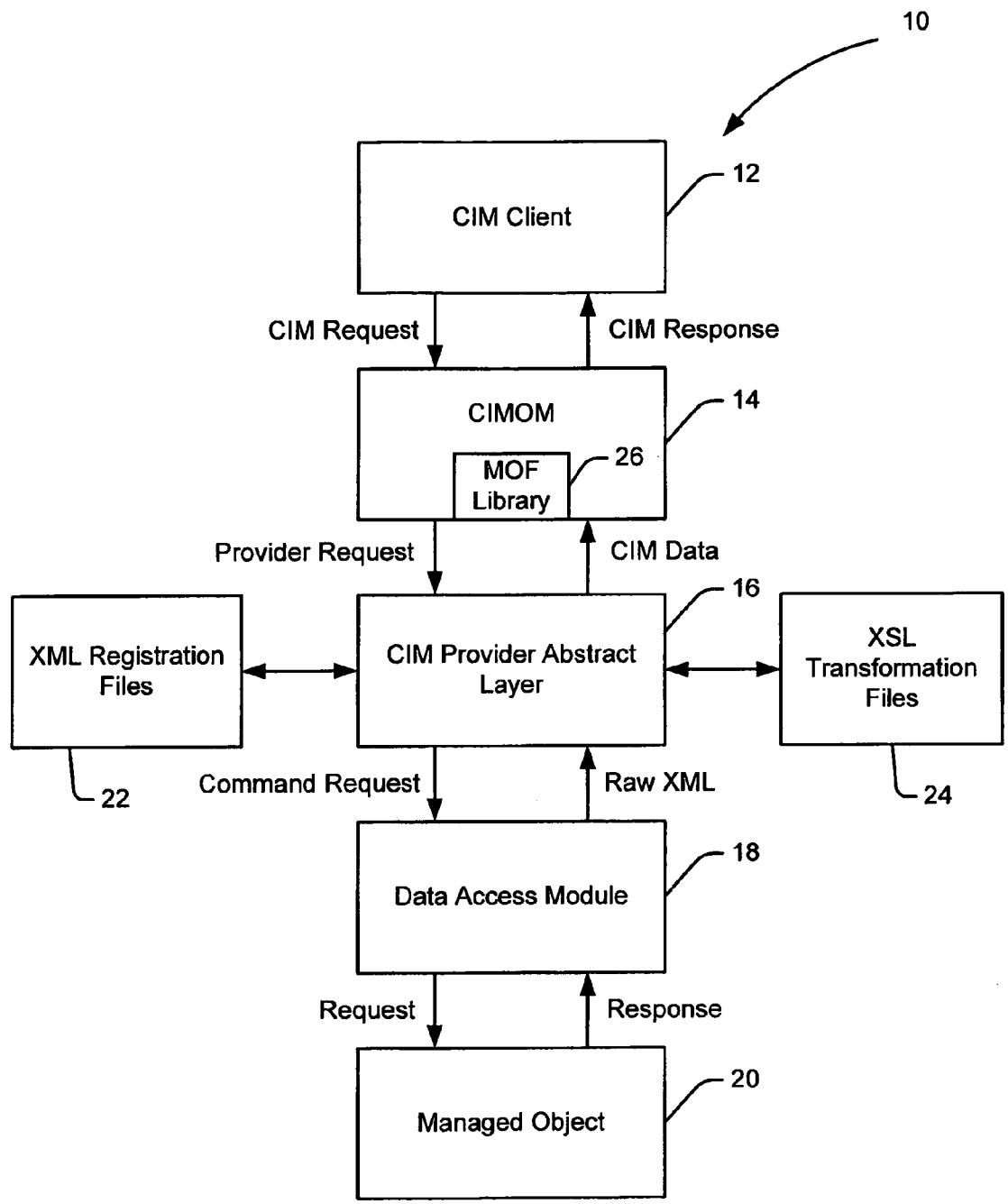
FIG. 1 is a diagram of the structure and process flow of a system that includes CIM provider abstract layer and related elements.

If the data retrieved by the CIM provider abstract layer needs to be translated, the XML registration file for the requested operation will also identify an extensible stylesheet language (XSL) transformation file. The CIM provider abstract layer will use the XSL transformation file to transform the retrieved XML content into CIM data that can be passed by the CIM provider abstract layer to the CIMOM and eventually to the CIM client. Shown in FIG. 1 is a diagram of the structure and process flow of a system 10 that includes CIM provider abstract layer and related elements. Included in the diagram of FIG. 1 is a CIM client 12, which communicates with CIMOM 14. CIM client 12 transmits CIM requests to CIMOM 14, which causes CIMOM 14 to initiate a provider request to CIM provider abstract layer 16. CIM provider abstract layer 16 communicates with and transmits command requests to data access module 18. In response, data access module 18 transmits requests to the managed object 20.

In response to a request from the data access module 18, managed object 20 returns a response. The response is transmitted from data access module 18 to CIM provider abstract layer 16 in the form of untransformed or raw XML content. CIM provider abstract layer 16 transforms the raw XML data into CIM data and transmits the CIM data to CIMOM 14, which transmits a CIM response to CIM client 12.

CIMOM 14 includes a number of Managed Object Format (MOF) files 26 in a MOF library. A MOF file is a data structure file that is used by the CIM to describe the managed objects of the system. Upon the receipt of a CIM request from the CIM client, CIMOM 14 determines if an MOF file for the managed object is in the MOF library. If a managed object is found, the CIM provider abstract layer is called by CIMOM 14 to execute a command request in response to the CIM request of CIM client 12. In response to the request from CIMOM, CIM provider abstract layer 16 will read the set of XML registration files 22 to determine if an XML registration file exists for the managed object 20. If an XML registration file exists for managed object 20, CIM provider abstract layer 16 uses the content of the XML registration file to generate the command request. When the raw XML data is returned to CIM provider abstract layer 16, CIM provider abstract layer 16 will request an XSL transformation file to convert the raw XML data to CIM data.

Figure 2A:
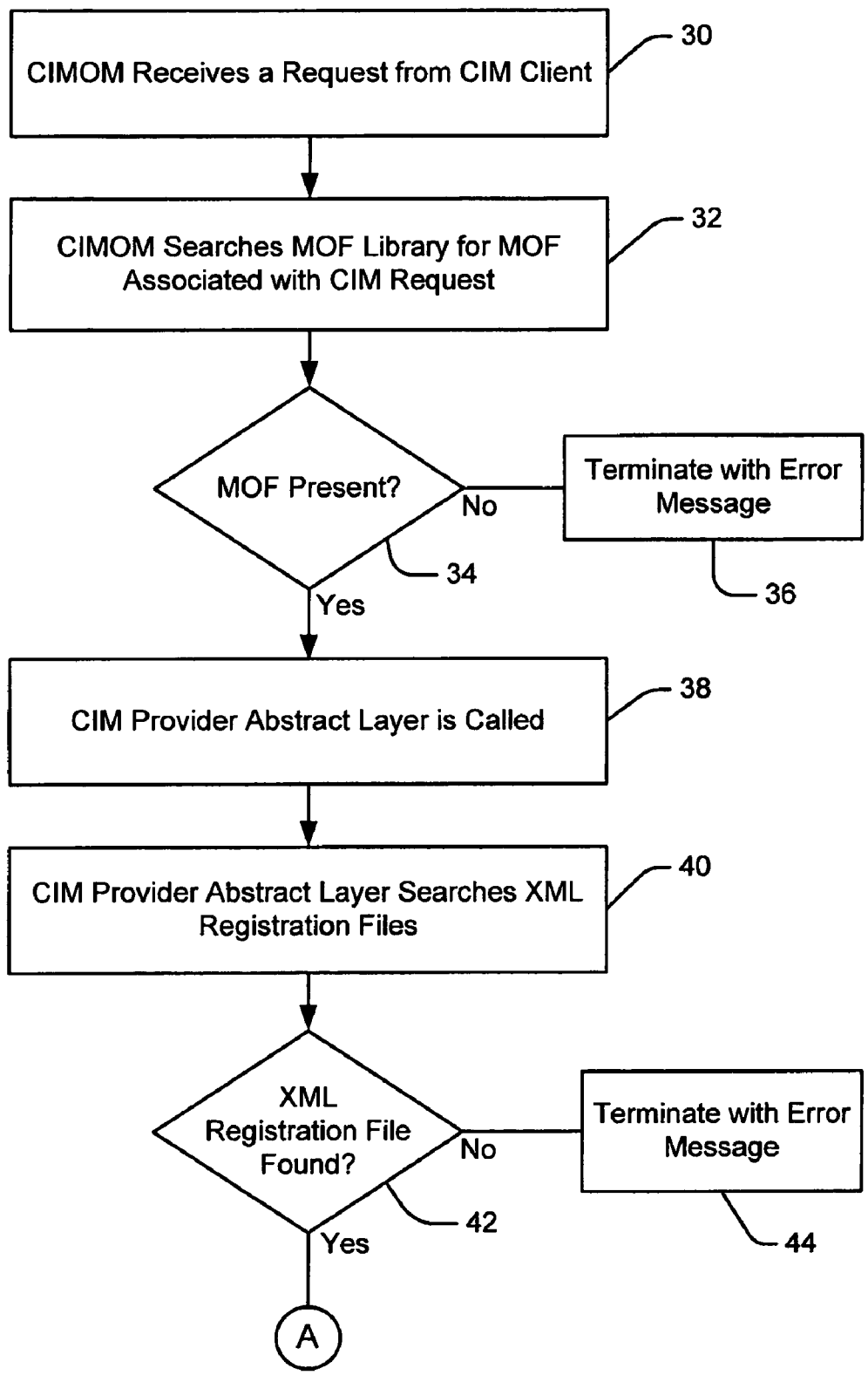
FIGS. 2A and 2B are flow diagrams of a series of method steps for processing commands in the system of FIG. 1.
Figure 2B:
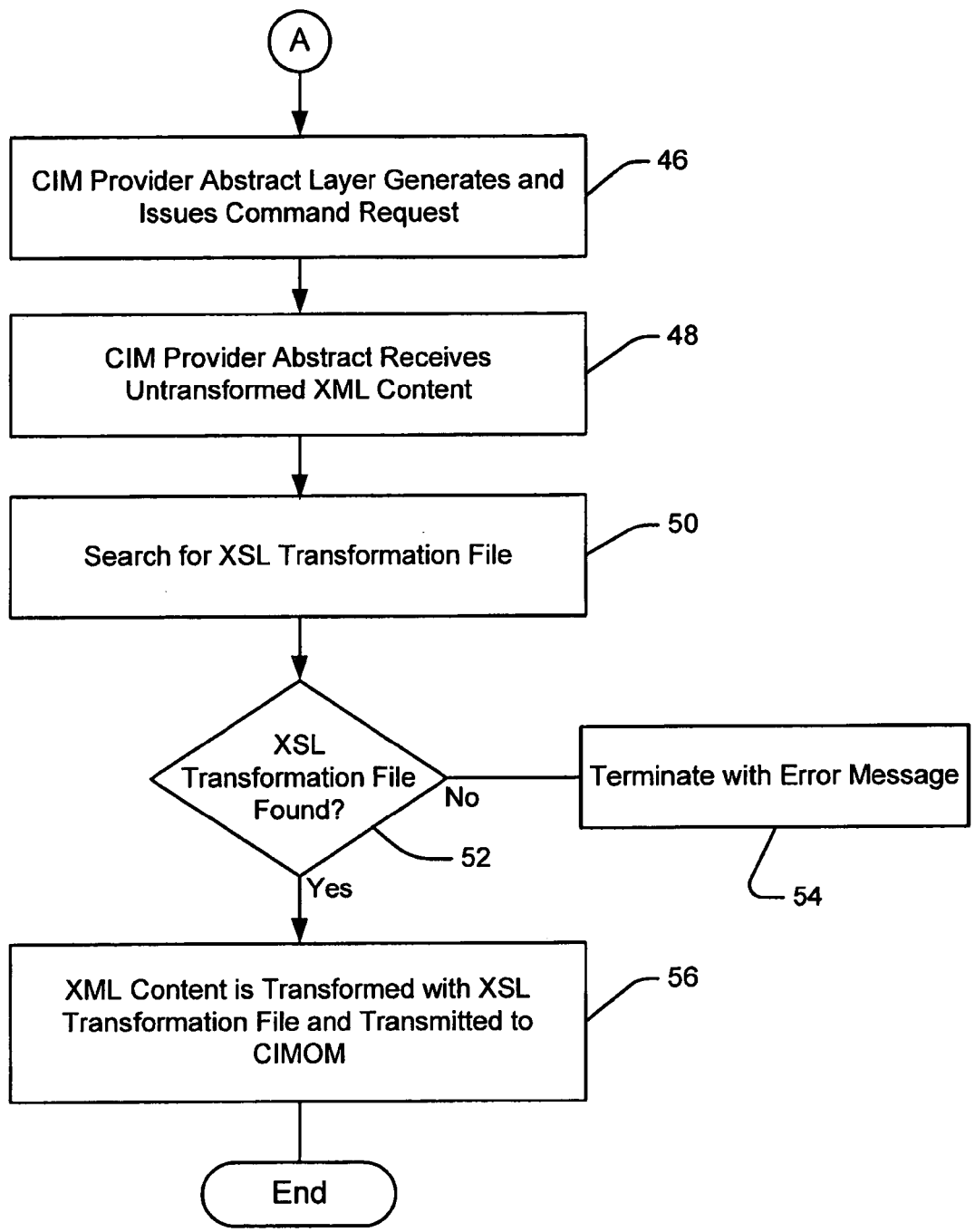

Shown in FIG. 2A and FIG. 2B are flow diagrams of a series of method steps for processing commands in the system of FIG. 1. At step 30 of FIG. 2A, the CIMOM receives a request from the CIM client. At step 32, the CIMOM searches its MOF library for the MOF associated with the request issued by the CIM client. It is determined at step 34 if the associated MOF is present. If the MOF is not found to be present, the process terminates with an error message at step 36. If the MOF is found to be present at step 34, the CIM provider abstract layer is called at step 38. After the CIM provider abstract layer is called, the CIM provider abstract layer searches the XML registration files for the registration file associated with the managed object and the request from the CIM client. At step 42, it is determined if the XML registration file associated with the managed object and the request is located in the library of registration files. If the associated registration file is not found, the process terminates with an error message at step 44. If the associated registration file is found, the process continues at point A in FIG. 2B.

At step 46 in FIG. 2B, the CIM provider abstract layer generates a command from the XML registration file and issues the command. Following the execution of the command at the data access module, the CIM provider abstract layer receives untransformed XML content at step 48. At step 50, the CIM provider abstract layer searches the library of XSL transformation files for the XSL transformation file necessary to transform the raw XML content received at the CIM provider abstract layer. If it is determined at step 52 that the necessary XSL transformation file is not present, the process terminates with an error message at step 54. If the necessary XSL transformation file is found, the XML content is transformed and transmitted to the CIMOM.

The system and method disclosed herein provides, as the system and method provides for forward-compatibility in the event of modifications to an existing CIM schema. If the CIM schema is modified, only the MOF file, XML registration file, and XSL transformation file would need to be changed to adapt to the changes to the CIM schema. In this manner, a modification to the CIM schema does not necessitate a rewriting of lower level instrumentation code in the disclosed system. The existence of easily modifiable MOF files, XML registration files, and XSL transformation files allows the system to be enabled and updated quickly in the event of a change to elements of the CIM schema. In addition, the software code of the system, including the software code of the XML registration files and the XSL transformation files, can be reused across a variety of CIM requests and managed objects.

Although it has been described herein that the content returned to the CIM provider abstract layer will be in an XML format, it should be understood that the system and method disclosed herein is not limited to content in the XML format. Rather, other formats, including text formats, could be used in accordance with the system and method disclosed herein. Although the present disclosure has been described in detail, it should be understood that various changes, substitutions, and alterations can be made hereto without departing from the spirit and the scope of the invention as defined by the appended claims.

What is claimed is:

1. An information handling system for managing objects in a system, wherein the system includes a predetermined schema for managing objects, comprising:
a processor;
memory coupled to the processor:
an object manager module, in communication with the processor, configured to interface with a client that is able to send requests to the system;
an abstract layer module, coupled to the processor, configured to:
receive requests from the object manager module;
receive untransformed content from a managed object;
use a set of transformation files to transform the untransformed content from the managed object into predetermined schema data; and
return the predetermined schema data to the object manager module;
a set of registration files stored on the memory, wherein the abstract layer module uses one or more of the registration files to generate commands to the managed object, wherein the one or more of the registration files comprise information for execution of the command.

2. The information handling system of claim 1, wherein the predetermined schema is the Common Information Model.

3. The information handling system of claim 1, wherein the untransformed content received from the managed object is XML content.

4. The information handling system of claim 3, wherein the transformation files are XSL transformation files.

5. The information handling system of claim 4, wherein the abstract layer module uses the XSL transformation files to convert the XML content into data in accordance with the Common Information Model.

6. The information handling system of claim 1, wherein the object manager module includes a library of data structure files that describe the managed objects of the system.

7. The information handling system of claim 6, wherein a modification to the predetermined schema necessitates a modification of one or more data structure files of the object manager module, one or more of the registration files, and one or more of the XSL transformation files, but does not necessitate a modification of the abstract layer module.

8. The information handling system of claim 1,
wherein the predetermined schema is the Common Information Model; and
wherein the untransformed content received from the managed object is XML content.

9. The information handling system of claim 1,
wherein the predetermined schema is the Common Information Model;
wherein the untransformed content received from the managed object is XML content; and
wherein the object manager module includes a library of data structure files that describe the managed objects of the system.

10. The information handling The system of claim 1,
wherein the predetermined schema is the Common Information Model;
wherein the untransformed content received from the managed object is XML content;
wherein the object manager module includes a library of data structure files that describe the managed objects of the system; and
wherein a modification to the predetermined schema necessitates a modification of one or more data structure files of the object manager module, one or more of the registration files, and one or more of the XSL transformation files, but does not necessitate a modification of the abstract layer module.

11. A method for managing objects in a system having a predetermined schema, comprising:
receiving at an abstract layer module a request from a client of the system, wherein the request is associated with a managed object of the system;
searching a set of registration files to locate a registration file associated with the request;
using the registration file to generate a command, wherein the registration file comprises information for execution of the command;
receiving the result of the command, wherein the result of the command includes content in a first format;
searching a set of transformation files;
using the transformation files to transform the result of the command into a second format; and
transmitting the transformed content to the client that issued the request.

12. The method for managing commands to a managed object in a system according to a predetermined schema of claim 11, wherein set of registration files includes XML registration files.

13. The method for managing commands to a managed object in a system according to a predetermined schema of claim 12, wherein the first format of the result of the command is XML content.

14. The method for managing commands to a managed object in a system according to a predetermined schema of claim 13, wherein the transformation files are XSL transformation files.

15. The method for managing commands to a managed object in a system according to a predetermined schema of claim 14, wherein the XSL transformation files transform the XML content into content associated with the predetermined schema of the Common Information Model.

16. The method for managing commands to a managed object in a system according to a predetermined schema of claim 11, wherein the predetermined schema is the predetermined schema of the Common Information Model.

17. A method for updating a system in accordance with the Common Information Model, comprising:
providing a system, wherein the system comprises,
an object manager module, wherein the object manger module interfaces with a client that is able to send requests to the system;
an abstract layer module, wherein the abstract layer module:
receives requests from the object manager module;
receives untransformed content from a managed object;
uses a set of transformation files to transform the untransformed content from the managed object into predetermined schema data; and
returns the schema data to the object manager module,
a set of registration files, wherein the abstract layer module uses one or more of the registration files to generate commands to the managed object, wherein the one or more of the registration files comprise information for execution of the command;

modifying the schema of a managed object;
modifying one or more registration files and one or more transformation files to reflect the modifications to the schema of the managed object, without the necessity of modifying the abstract layer module.

18. The method for updating a system in accordance with the Common Information Model of claim 17, wherein the set of registration files are XML registration files.

19. The method for updating a system in accordance with the Common Information Model of claim 17, wherein the set of transformation files are XSL transformation files.

20. The method for updating a system in accordance with the Common Information Model of claim 17,
wherein the set of registration files are XML registration files and wherein the untransformed content received from the managed object is XML content; and
wherein the set of transformation files are XSL transformation files, and wherein the XSL transformation files transform the XML content received from the managed object into schema data in accordance with the Common Information Model.

21. A computer program, stored in a tangible medium for managing objects in a system, wherein the system includes a predetermined schema for managing objects, including executable instructions to cause at least one processor to:
interface an object manager module with a client that is able to send requests to the system;
receive requests at an abstract layer module from the object manager module;
receive untransformed content at the abstract layer module from a managed object;
use a set of transformation files at the abstract layer module to transform the untransformed content from the managed object into predetermined schema data
return the predetermined schema data at the abstract layer module to the object manager module;
cause the abstract layer module to use one or more of the registration files to generate commands to the managed object, wherein the one or more of the registration files comprises information for execution of the command.

* * * * *